United States Patent [19]

Dawson et al.

[11] Patent Number: 5,714,392
[45] Date of Patent: Feb. 3, 1998

[54] RAPID THERMAL ANNEAL SYSTEM AND METHOD INCLUDING IMPROVED TEMPERATURE SENSING AND MONITORING

[75] Inventors: Robert Dawson; Frederick N. Hause; Charles E. May, all of Austin, Tex.

[73] Assignee: Advanced Micro Devices, Inc., Sunnyvale, Calif.

[21] Appl. No.: 687,857

[22] Filed: Jul. 26, 1996

[51] Int. Cl.⁶ .......................... G01R 31/26; H01L 21/66; H01L 21/324; H01L 21/477
[52] U.S. Cl. .......................... 437/8; 437/247; 356/45; 356/328; 37/124; 37/130
[58] Field of Search ................ 437/8, 247; 250/339.01, 250/339.06, 339.14, 341; 356/45, 328; 374/124, 130

[56] References Cited

U.S. PATENT DOCUMENTS

| | | |
|---|---|---|
| 4,842,353 | 6/1989 | Thevenon .................. 356/328 |
| 4,983,039 | 1/1991 | Harada et al. .............. 356/328 |
| 5,118,200 | 6/1992 | Kirillov et al. ............. 374/120 |
| 5,155,337 | 10/1992 | Sorrell et al. .............. 519/411 |
| 5,156,461 | 10/1992 | Moslehi et al. ............ 374/124 |
| 5,213,985 | 5/1993 | Sandroff et al. ............. 437/8 |
| 5,249,142 | 9/1993 | Shirakawa et al. .......... 356/45 |
| 5,359,693 | 10/1994 | Nenyei et al. ............. 437/247 |
| 5,376,592 | 12/1994 | Hashiguchi et al. ........ 437/247 |

*Primary Examiner*—Brian Dutton
*Attorney, Agent, or Firm*—Skjerven, Morrill, MacPherson, Franklin & Friel LLP; Ken J. Koestner

[57] ABSTRACT

A broadband pyrometer is used for sensing temperature of a semiconductor wafer in an RTA system in association with a monochromator to cancel the backside characteristics of the semiconductor wafer. A rapid thermal anneal (RTA) system includes a rapid thermal anneal (RTA) chamber, a heating lamp arranged in the vicinity of the RTA chamber for heating interior to the RTA chamber, a broadband pyrometer disposed in the vicinity of the RTA chamber and directed to measure interior to the RTA chamber, and a grating monochromator connected to the broadband pyrometer.

12 Claims, 3 Drawing Sheets

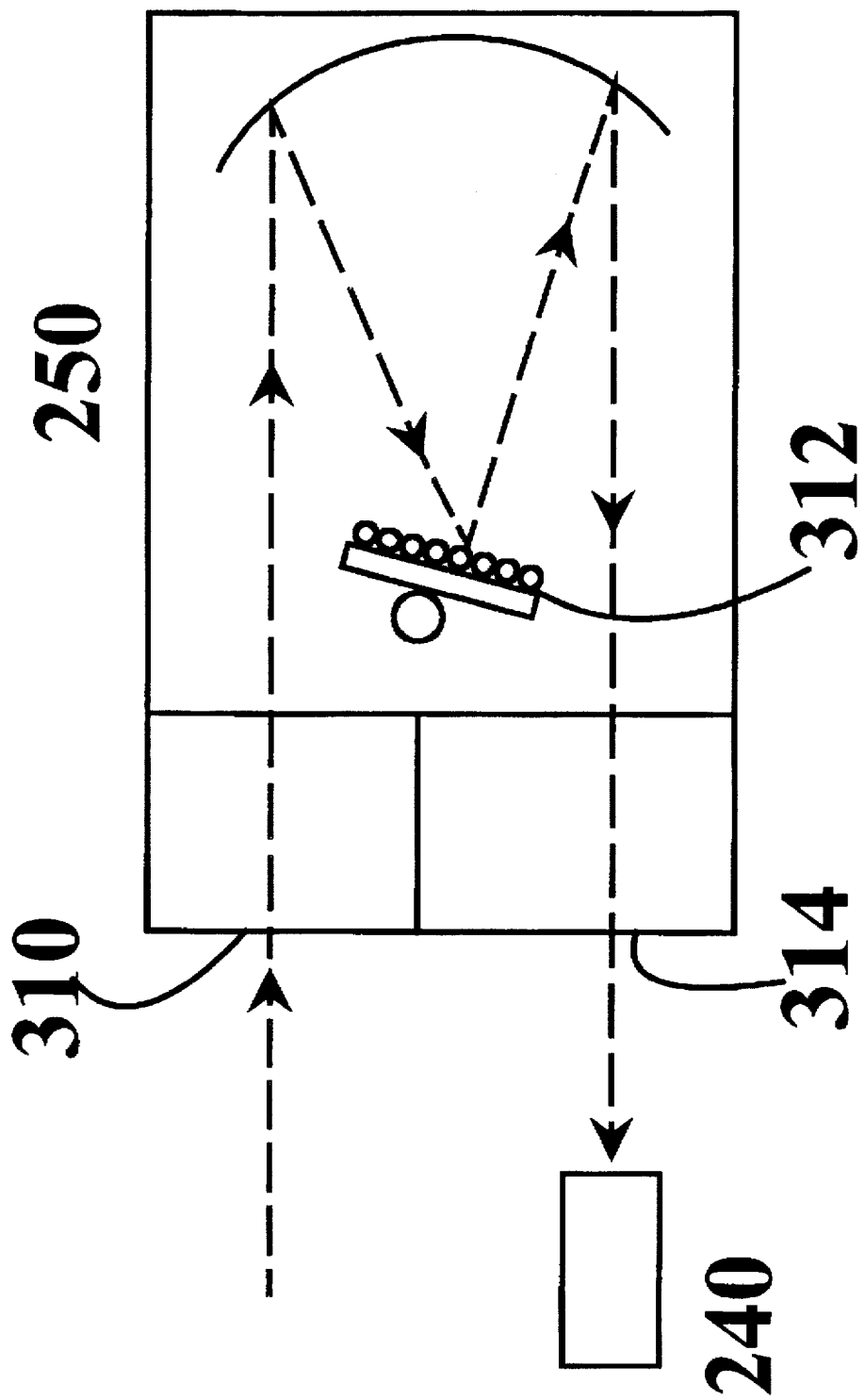

RAPID THERMAL ANNEAL SYSTEM AND METHOD INCLUDING IMPROVED TEMPERATURE SENSING AND MONITORING

BACKGROUND OF THE INVENTION

1. Field of the Invention

The present invention relates to a rapid thermal annealing (RTA) semiconductor manufacturing system and method. More specifically, the present invention relates to an RTA system and method having improved temperature sensing, monitoring and control.

2. Description of the Related Art

Rapid thermal annealing (RTA) is a semiconductor fabrication technique using short-time, high temperature processing to avoid unwanted dopant diffusion that would otherwise occur at the high processing temperatures of 900° C. to 1000° C. or greater that are used to dissolve extended defects in silicon (Si) and gallium arsenide (GaAs). The duration of an RTA process ranges from seconds to a few minutes so that semiconductor substrates are subjected to high temperatures only long enough to attain a desired process effect but not so long that a large degree of dopant diffusion takes place. RTA is typically performed in specially-designed systems rather than conventional furnaces or reactors which include susceptors, wafer boats and reactor walls having a large thermal mass which prevents performance of rapid thermal cycling. Early RTA processes used lasers as an energy source, allowing a high degree of heating to occur within fractions of a microsecond without significant thermal diffusion. Unfortunately, the wafer surfaces had to be scanned by small spot-size laser beams, causing lateral thermal gradients and wafer warping.

Subsequently, large-area incoherent energy sources were developed to overcome these limitations. These energy sources emit radiant light, which then heats the wafers, allowing very rapid and uniform heating and cooling. RTA systems have been developed in which wafers are thermally isolated so that radiant, not conductive, heating and cooling predominates. Temperature uniformity is a primary design consideration in these systems so that thermal gradients, which cause slip and warpage, are avoided. RTA systems use various heat sources including arc lamps, tungsten-halogen lamps, and resistively-heated slotted graphite sheets.

Several difficulties arise in achieving temperature uniformity. First, to raise the temperature of a semiconductor wafer of course requires heating of the slide carriers and insertion equipment for handling the wafer. The large thermal mass of slide carriers and insertion equipment extend the process times to at least fifteen to thirty minutes to obtain reproducible results. Significant changes in the doping profile of the wafer can occur over this time, causing difficulty in forming a desired structure in the substrate. For example, the precise alignment of shallow junctions becomes difficult to control when the temperature is not controllable.

A second problem is that dopants such as arsenic can be lost through preferential evaporation effects. In GaAs, arsenic loss is severe with considerable deterioration of the semiconductor material unless the semiconductor is appropriately capped.

Temperature uniformity is typically tested by measuring the emissivity of a semiconductor wafer. Emissivity is defined as the ratio of power per unit area radiated from a surface to the power radiated by a black body at the same temperature when radiation is produced by the thermal excitation or agitation of atoms or molecules. When a semiconductor wafer is heated, such as occurs in rapid thermal annealing, the temperature of the wafer is raised and the increase in temperature is detectable by an optical signal with a characteristic spectrum that is indicative of the wafer temperature. A measurement of emissivity quantifies the characteristic spectrum.

Referring to FIG. 1, an intensity-wavelength plot of the frequency spectrum response 100 of an infrared pyrometer is shown. In a typical conventional rapid thermal anneal system, a single fixed-wavelength pyrometer, for example having a wavelength of $2.7\mu$, is used to measure temperature, typically at one or two positions. The frequency spectrum detected by the infrared pyrometer is neither narrow-band limited or broad-band limited, having a detection band of a few angstroms of receptive wavelength in the vicinity of the infrared region. One problem which arises using the infrared pyrometer to detect emissivity is that only wavelengths in the relatively limited range of the infrared spectrum are detected.

Thus, the conventional usage of an infrared pyrometer ignores emissivity in other regions of the spectrum, tantamount to an assumption that emissivity occurs at a constant level across a broad spectrum and that the infrared regions is highly representative of the emissivity of the broad spectrum. However, these assumptions are erroneous.

As a semiconductor wafer is illuminated, the wafer absorbs part of the energy and reflects part of the energy. The relative amount of energy reflected and absorbed is highly dependent on the type of films on the wafer, which may be highly variable from wafer to wafer. The relative amount of energy that is reflected and absorbed is highly position-dependent in the wafer. The wafer surface generally includes various oxides, polysilicon, deposited oxides and the like, generally having variable thicknesses and types. Differences in both the type of material and the thickness of the material on the semiconductor wafer relate to variability in the absorption and reflectivity of local areas of the wafer, causing variations in emissivity at different regions of the semiconductor wafer. For example, absorption of radiant heat by the semiconductor wafer is related to the free carrier concentration so that the heating rate for heavily doped material is more rapid than for semiconductor wafers with less doping.

Nulls occasionally occur in which substantially no energy is reflected and thereby detected by the infrared pyrometer. In particular, the various types of deposits and deposition thicknesses act as a quarter-wave plate in which energy is absorbed in a material of a particular type and thickness which is coincident with the effective wavelength of the pyrometer so that a quarter-wave path difference with a relative phase shift of 90° occurs between ordinary and extraordinary waves. Thus, substantially all of the energy at the effective wavelength of the pyrometer is absorbed in the material and very little is reflected. The pyrometer badly misjudges the temperature of the wafer in these regions, measuring a temperature that is much lower than the actual temperature.

The temperature measurement system is typically used in a feedback control system which responds to the detected low temperature by increasing the intensity of the heating lamps or extending the duration of annealing. The increase in RTA processing damages or destroys the semiconductor wafer in process.

Present day rapid thermal anneal systems typically address the problems of Emissivity measurement variations and temperature measurement inaccuracies by attempting to construct an ideal RTA chamber, specifically an RTA chamber which is most equivalent to a black body radiator so that the only energy absorbing component in the chamber is the semiconductor wafer. However, even with an ideal RTA chamber, absorption by the semiconductor wafer introduces variability in temperature measurement that may not be compensated.

What is needed is a method and system for monitoring and accurately controlling temperature in a rapid thermal anneal system.

SUMMARY OF THE INVENTION

In accordance with one aspect of the present invention, a broadband pyrometer is used for sensing temperature of a semiconductor wafer in an RTA system in association with a monochromator to cancel the backside characteristics of the semiconductor wafer.

In accordance with one embodiment of the present invention, a rapid thermal anneal (RTA) system includes a rapid thermal anneal (RTA) chamber, a heating lamp arranged in the vicinity of the RTA chamber for heating interior to the RTA chamber, a broadband pyrometer disposed in the vicinity of the RTA chamber and directed to measure interior to the RTA chamber, and a grating monochromator connected to the broadband pyrometer.

Several advantages are achieved by the described system and method. One advantage is that temperatures inside an RTA chamber are more accurately measured. Another advantage is that the improved accuracy of temperature measurement allows for improved temperature control in the chamber. A further advantage is that usage of a grating monochromator attains a high spectral resolution and a high updating rate of several times per second so that a feedback control system achieves a rapid response. Another advantage is that the grating monochromator distinguishes emissivity at substantially all frequencies thereby supplying detection of nulls in the spectrum caused by quarter-wave effects and other discontinuities in the temperature measurement.

BRIEF DESCRIPTION OF THE DRAWINGS

The present invention may be better understood, and its numerous objects, features, and advantages made apparent to those skilled in the art by referencing the accompanying drawings.

FIG. 3 is a schematic diagram illustrating the operation of a grating monochromator.

DETAILED DESCRIPTION OF THE PREFERRED EMBODIMENTS

Figure 1:
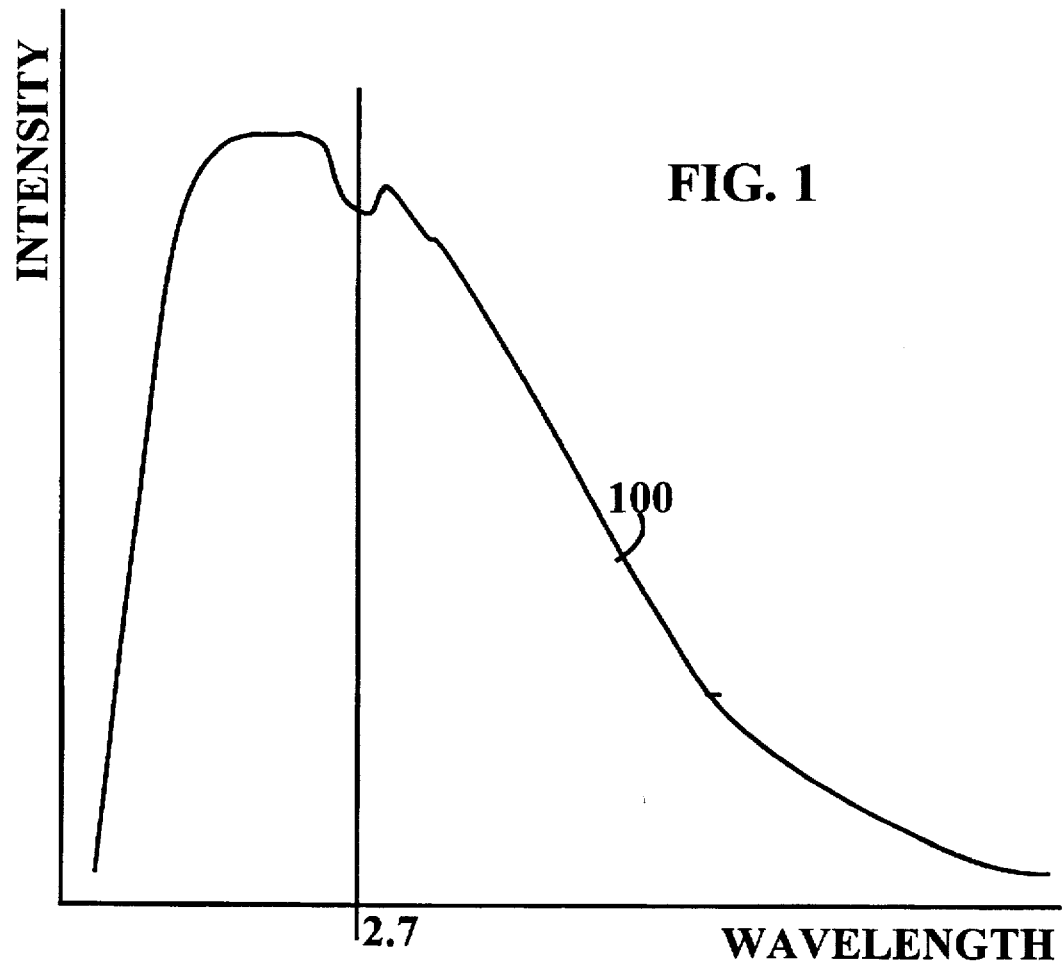
FIG. 1, labeled PRIOR ART, shows an intensity-wavelength plot of the frequency spectrum response of an infrared pyrometer.
Figure 2:
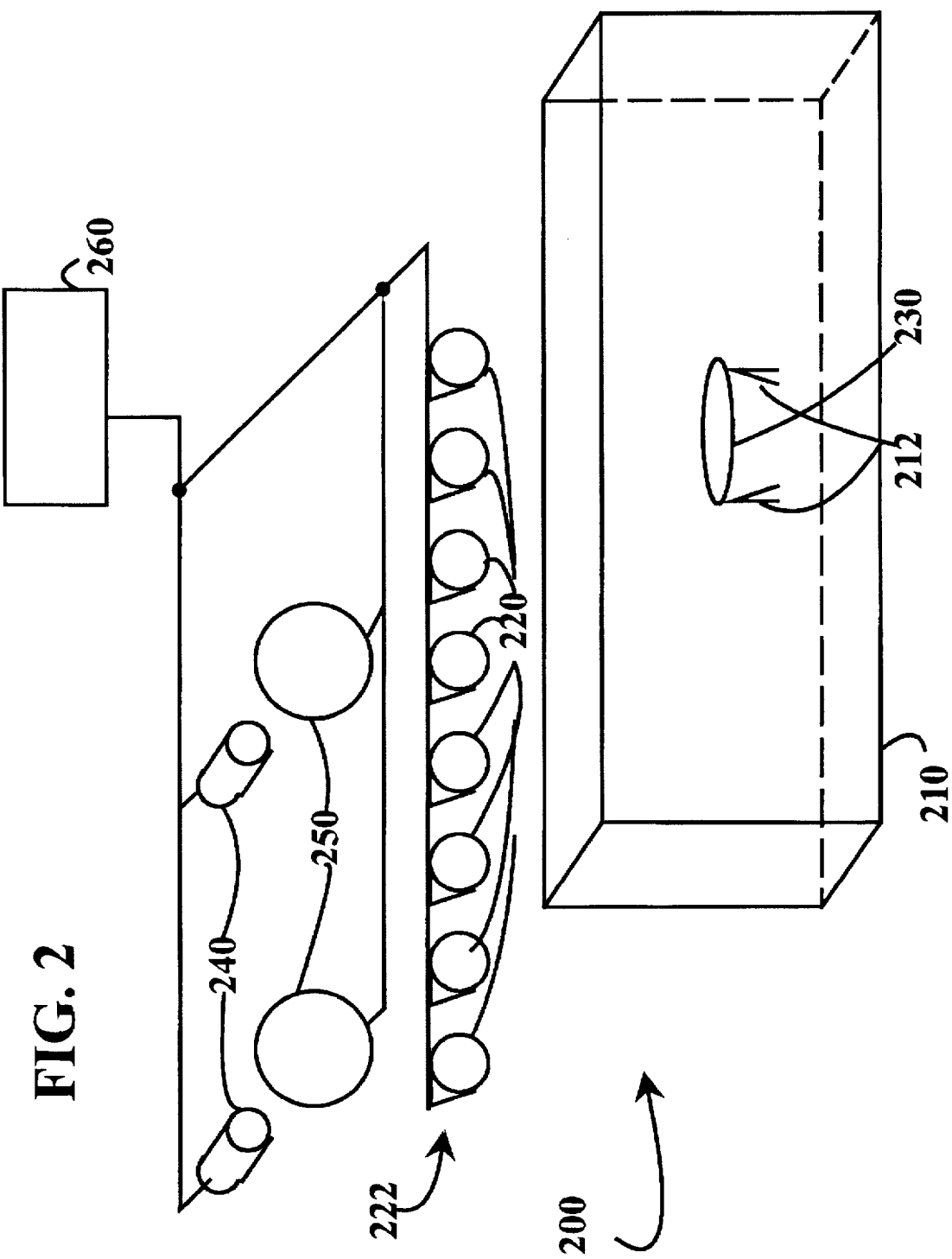
FIG. 2 is a schematic block diagram depicting a rapid thermal annealing (RTA) system in accordance with one embodiment of the present invention.

Referring to FIG. 2, a schematic block diagram illustrates a water-cooled rapid thermal anneal (RTA) system 200 including an RTA chamber 210, a plurality of tungsten halogen lamps 220 for heating a semiconductor wafer 230 within the RTA chamber 210, two broadband pyrometers 240 for monitoring the heating of the semiconductor wafer 230, and one or more grating monochromators 250 respectively associated with the broadband pyrometers 240. Two examples of broadband pyrometers are pyrometers within infrared spectrometers manufactured by Nicolet Instrument Corp. Madison, Wis., and manufactured by The Perkin-Elmer Corporation, Norwalk, Conn. Point supports 212 hold the semiconductor wafer 230 to alleviate thermal mass effects. The temperature is monitored by measuring emissivity with the pyrometers 240 and using feedback control of the emissivity measurement to control heating by the lamps 220. The RTA system 200 further includes a control circuit 260 connected to the broadband pyrometers 240, the grating monochromators 250 and the tungsten halogen lamps 220.

The control circuit 260 is connected to the broadband pyrometers 240 to receive signals indicative of emissivity and, therefore, temperature within the RTA chamber 200. Circuits with connections to a measurement device such as a pyrometer or thermocouple for measuring or deriving temperature are well known. The control circuit 260, which includes switches and an adjuster such as a potentiometer or pulse width modulation, system for controlling the time and intensity of heating. Circuits with connections to heating elements for controlling the time and intensity of heating are well known. The control circuit 260 is connected to the grating monochromators 250 for adjusting the wavelength of radiation passed to the broadband pyrometers 240.

Circuits with connections to a grating monochromator or spectrometer for adjusting the radiation wavelengths passed by a filter are well known.

RTA chamber 210 is a heating chamber supplying a controlled environment for the semiconductor wafer 230 and for supplying energy from the lamps 220 to the semiconductor wafer 230. The RTA chamber 210 forms an air-tight structure so that heating is supplied under conditions of inert atmospheres of argon (Ar) and nitrogen ($N_2$) or a vacuum. In some RTA systems, oxygen and ammonia is supplied for growth of oxide ($SiO_2$) and nitride ($Si_3N_4$) into an RTA chamber. Nitrogen source gases such as NO and $N_2O$ can be used to implant nitride into oxide films.

A plurality of lamps 220, such as arc lamps, tungsten-halogen lamps and the like, are arranged about the RTA chamber 210. In the illustrative RTA system 200, the lamps 220 are arranged in a suitable linear array 222. In other embodiments, the lamps 220 are arranged in other suitable formations including, for example, an hexagonal array of lamps. The lamps 220 have a controlled intensity. In some embodiments, all lamps are controlled commonly. In other embodiments, each lamp is individually controlled. Switched incoherent heat sources are typically used although coherent heat sources may also be used.

The illustrative RTA system 200 includes two broadband pyrometers 240 for monitoring wafer temperature, representing a suitable balance oft he cost of a broadband pyrometer and the benefits attained by improved sensing. Other RTA system embodiments may include one pyrometer or three to five pyrometers. Essentially any number of pyrometers may be employed. Usage of multiple pyrometers allows usage of a single pyrometer to monitor the center of the backside of the semiconductor wafer 230 and an additional array of pyrometers to measure temperature as a function of angular position. The measurement of multiple positions on a semiconductor wafer 230 is used to establish temperature uniformity via a temperature feedback control system.

In the illustrative embodiment, two broadband pyrometers 240 are used for monitoring uniformity of heating in a semiconductor wafer 230 during rapid thermal annealing by measuring emissivity of the semiconductor wafer 230. The broadband pyrometer 240 is sensitive to a wide portion of the infrared spectrum. One example of a suitable pyrometer 240 is a total radiation pyrometer which functions on the basis of the Stefan-Boltzmann law $E=\sigma T^4$ relating the radiant flux per unit area emitted by a black body to the temperature. E is the radiant exitante, $\sigma$ is the Stefan-Boltzmann constant and T is the temperature. Also, the Stefan-Boltzmann constant $\sigma = 2\pi^5 k^4 / 15 h^3 c^2$ where k is the Boltzmann constant, c is the speed of light in a vacuum and h is the Planck constant.

Thus, the broadband pyrometer 240 is sensitive to a wide portion of the infrared spectrum but does not discriminate between absorption and reflection at different wavelengths. A grating monochromator 250 functions as an input filter to each broadband pyrometer 240 to sharply narrow the band of frequencies applied to the broadband pyrometer 240 to a monochromatic band, approximating a single frequency. Each grating monochromator 150 is adjusted over time to vary the band of wavelengths applied to the broadband pyrometer 240 for accurately sampling a narrow portion of the spectrum for several frequency ranges to generate data relating intensity to wavelength over a wide range of wavelengths.

The grating monochromators 250 are used to control the measured band of frequencies, rather than another band adjustment technique, because the grating monochromator 250 achieves a very fast scan time. Using a grating monochromator 250, a large number of monochromatic bands, for example approximately 2-3 decades of frequency per second, may be monitored, covering the entire broadband spectrum of the pyrometer 240 in less than one second. Usage of the grating monochromators 250 advantageously achieves a high spectral resolution and a high updating rate of several times per second, attaining a rapid response in a temperature sensed feedback control system. By scanning the entire broadband spectrum of the broadband pyrometer 240, the grating monochromator 250 distinguishes the emissivity at substantially all frequencies supplying detection of nulls in the spectrum caused by quarter-wave effects and other discontinuities in the temperature measurement.

Each broadband pyrometer 240 measures emissivity through a grating monochromator 250 which filters the radiation from the semiconductor wafer 230 into monochromatic radiation, which is electromagnetic radiation of a single frequency or, more accurately, radiation within a narrow range of frequencies. The grating monochromator 250 is controlled to sample intensity for multiple narrow ranges of frequency. The grating monochromator 250 functions as an interference filter for examining an emission spectrum with radiation from the semiconductor wafer 230 passing through a collimator (not shown) which produces a parallel beam of radiation that is deviated by an angular deviation and dispersed by a diffraction grating (not shown). The angular deviation depends on wavelengths of the radiation. The refracted or diffracted radiation is observed or recorded to allow measurement of the angular deviation.

The grating monochromator 250 controls the monitoring wavelength so that the semiconductor wafer 230 is scanned over a plurality of frequencies and scanned across the wafer surface to determine the location of intensity nulls that are indicative of point absorbencies.

Referring to FIG. 3, a schematic diagram illustrating the operation of a grating monochromator 250 shows radiation entering at an entry 310, reflected by a concave grating 312 through an exit slit 314 onto the broadband pyrometer 240. In this embodiment, both the entry slit 310 and the exit slit 314 are held at a constant position and the grating 212 is rotated through a range of angles. Furthermore, in this embodiment a collimator is optional because the grating 312 is ruled on a concave mirror which focuses the radiation. At a particular angle of the grating 312, radiation of a specific wavelength is focused onto the exit slit 314. The angle of the grating 312 is scanned so that a plurality of monochromatic measurements are taken.

While the invention has been described with reference to various embodiments, it will be understood that these embodiments are illustrative and that the scope of the invention is not limited to them. Many variations, modifications, additions and improvements of the embodiments described are possible. For example one broadband pyrometer may be used in an RTA system or multiple broadband pyrometers may be used. Similarly, a single grating monochromator may be supplied for each broadband pyrometer, a single grating monochromator may be supplied for multiple broadband pyrometers or multiple grating monochromators may be supplied for a single broadband pyrometer.

What is claimed is:

1. A method of sensing temperature in a rapid thermal anneal (RTA) system comprising the steps of:

heating the interior of a rapid thermal anneal (RTA) chamber;

measuring radiation interior to the RTA chamber using a broadband pyrometer directed to said interior of the RTA chamber; and filtering radiation directed to the broadband pyrometer to a plurality of narrow wavelength bands using a grating monochromator coupled to the broadband pyrometer.

2. A method according to claim 1 further comprising the steps of:

scanning a plurality of filtering wavelengths of the grating monochromator; and measuring a temperature interior to the RTA chamber at a plurality of radiation wavelengths corresponding to the plurality of filtering wavelengths of the grating monochromator.

3. A method according to claim 2 wherein the step of scanning a plurality of filtering wavelengths of the grating monochromator further comprises the step of:

controlling a monitoring wavelength;

scanning a semiconductor wafer interior to the RTA chamber over a plurality of monitoring wavelengths;

scanning across the semiconductor wafer surface; and determining the location of intensity nulls indicative of point absorbencies.

4. A method according to claim 2 wherein the step of scanning a plurality of filtering wavelengths of the grating monochromator further comprises the step of:

scanning a semiconductor wafer interior to the RTA chamber over a plurality of frequencies;

distinguishing emissivity at substantially all frequencies generating detection nulls in an emissivity spectrum caused by quarter-wave effects and temperature measurement discontinuities.

5. A method according to claim 2 wherein the step of scanning a plurality of filtering wavelengths of the grating monochromator further comprises the step of:

monitoring monochromatic bands covering the entire broadband spectrum of the broadband pyrometer in less than one second.

6. A method according to claim 1 further comprising the steps of:

adjusting the intensity and time duration of heating of said interior of the PTA chamber in response to the measured radiation in a temperature sensed feedback control system.

7. A method of controlling a rapid thermal anneal (RTA) system comprising the steps of:

heating the interior of a rapid thermal anneal RTA chamber;

measuring radiation interior to the RTA chamber using a broadband pyrometer directed to said interior of the. RTA chamber;

filtering radiation directed to the broadband pyrometer to a plurality of narrow wavelength bands using a grating monochromator coupled to the broadband pyrometer;

detecting radiation intensity for the plurality of narrow wavelength bands; and adjusting the intensity and duration of heating in response as a function of the detected radiation intensity.

8. A method according to claim 7 further comprising the steps of:

adjusting the intensity and time duration of heating of said interior of the RTA chamber in response to the measured radiation in a temperature sensed feedback control system.

9. A method according to claim 7 further comprising the steps of:

scanning a plurality of filtering wavelengths of the grating monochromator; and measuring a temperature interior to the RTA chamber at a plurality of radiation wavelengths corresponding to the plurality of filtering wavelengths of the grating monochromator.

10. A method according to claim 9 wherein the step of scanning a plurality of filtering wavelengths of the grating monochromator further comprises the step of:

controlling a monitoring wavelength;

scanning a semiconductor wafer interior to the RTA chamber over a plurality of monitoring wavelengths;

scanning across the semiconductor wafer surface; and determining the location of intensity nulls indicative of point absorbencies.

11. A method according to claim 9 wherein the step of scanning a plurality of filtering wavelengths of the grating monochromator further comprises the step of:

scanning a semiconductor wafer interior to the RTA chamber over a plurality of frequencies;

distinguishing emissivity at substantially all frequencies generating detection nulls in an emissivity spectrum caused by quarter-wave effects and temperature measurement discontinuities.

12. A method according to claim 9 wherein the step of scanning a plurality of filtering wavelengths of the grating monochromator further comprises the step of:

monitoring monochromatic bands covering the entire broadband spectrum of the broadband pyrometer in less than one second.

* * * * *

UNITED STATES PATENT AND TRADEMARK OFFICE
CERTIFICATE OF CORRECTION

PATENT NO. : 5,714,392
DATED : February 3, 1998
INVENTOR(S) : Dawson, Robert; Hause, Frederick N.; May, Charles E.

It is certified that error appears in the above-identified patent and that said Letters Patent is hereby corrected as shown below:

Col. 4, line 51   replace "oft he" with --of the--;

Col. 7, line 2    replace "PTA" with --RTA--.

Signed and Sealed this

Twenty-seventh Day of October, 1998

Attest:

BRUCE LEHMAN

Attesting Officer    Commissioner of Patents and Trademarks